United States Patent [19]

Matsuura et al.

[11] Patent Number: 5,274,563
[45] Date of Patent: Dec. 28, 1993

[54] NONCONTACT TRACING CONTROL SYSTEM

[75] Inventors: Hitoshi Matsuura, Hachioji; Eiji Matsumoto, Yamanashi, both of Japan

[73] Assignee: Fanuc Ltd., Minamitsuru, Japan

[21] Appl. No.: 855,003

[22] PCT Filed: Aug. 23, 1991

[86] PCT No.: PCT/JP91/01136
§ 371 Date: May 1, 1992
§ 102(e) Date: May 1, 1992

[87] PCT Pub. No.: WO92/04157
PCT Pub. Date: Mar. 19, 1992

[30] Foreign Application Priority Data

Sep. 7, 1990 [JP] Japan .................. 2-238058

[51] Int. Cl.⁵ .............. G06F 15/46; G01B 11/00; B23Q 35/123
[52] U.S. Cl. .............. 364/474.03; 364/474.03; 318/571; 318/577; 318/578; 318/579
[58] Field of Search ............ 364/474.03, 474.29, 364/474.08; 318/569, 571, 577, 578, 579

[56] References Cited

U.S. PATENT DOCUMENTS

| | | | |
|---|---|---|---|
| 5,015,130 | 5/1991 | Matsuura et al. | 364/474.03 |
| 5,019,993 | 5/1991 | Montalcini et al. | 364/474.29 |
| 5,140,239 | 8/1992 | Matsuura | 318/577 |
| 5,182,714 | 1/1993 | Matsuura | 364/474.03 |

FOREIGN PATENT DOCUMENTS

| | | |
|---|---|---|
| 61-274852 | 12/1986 | Japan . |
| 64-64753 | 3/1989 | Japan . |
| 1-109058 | 4/1989 | Japan . |
| 0313801 | 5/1989 | Japan . |
| 1-188254 | 7/1989 | Japan . |
| 3-3760 | 1/1991 | Japan . |
| 3-60956 | 3/1991 | Japan . |
| 3-121754 | 5/1991 | Japan . |

Primary Examiner—Jerry Smith
Assistant Examiner—Paul Gordon
Attorney, Agent, or Firm—Staas & Halsey

[57] ABSTRACT

A noncontact tracing control system for tracing machining a workpiece through a tracing of the contour of a model without contact. Coordinate values of a plurality of points on the model surface are acquired from measured values obtained by a plurality of times of sampling from two noncontact distance detectors (5a, 5b) provided at a tracer head of a tracing machine (3). A noncontact tracing control system (1) selects three points forming a triangle closest to an equilateral triangle, from among these points. A normal vector is acquired using the coordinate values of the vertices of these three points and outputs a command (SC) for rotating the tracer head (4) in the direction of a projection of this normal vector onto the X-Y plane. This command (SC) passes a D/A converter (17c), is amplified at an amplifier (18c), drives a motor (32c) and rotates the tracer head (4). As the measuring axis of the noncontact distance detectors (5a, 5b) is oriented in the direction most nearly perpendicular to the model surface, the distance thereto can be measured with a high accuracy.

5 Claims, 5 Drawing Sheets

NONCONTACT TRACING CONTROL SYSTEM

TECHNICAL FIELD

The present invention relates to a noncontact tracing control system, and more particularly, to a noncontact tracing control system with an improved tracing accuracy.

BACKGROUND ART

A recently developed noncontact tracing control system utilizing a noncontact distance detector for tracing the contour of a model uses an optical distance detector fixed at the tip end of a tracer head and detecting a distance to the model surface, for a tracing thereof. This system eliminates worry about damage to the model, and therefore, a soft material model can be used, and thus the applicability thereof in tracing machining is expected to expand.

Nevertheless, the conventional noncontact tracing control system has a problem in that the tracing accuracy is low at portions of a model where an inclination thereof is large. Namely, in such a portion, an optical measuring axis of a distance detector becomes almost parallel to the model surface, whereby a spot on the model surface is expanded and becomes an ellipsoid, and thus the resolution of the distance detector is lowered, and accordingly, the tracing accuracy also is lowered. Particularly for a trigonometrical distance detector, a measurement sometimes becomes impossible because, depending on this angle, the optical measuring axis interferes with the model surface.

To solve this problem, two detectors are used, the measurement is conducted a number of times, three optional points are selected from among the plurality of points obtained, a normal vector of a model surface is acquired from these three points, and the distance detectors are rotated in the direction of this normal vector, to thereby improve the measurement accuracy. An example of the above is disclosed in Japanese Patent Application No. Hei 1-194500.

Nevertheless, when three points are selected at random from among the plurality of points obtained, such points might be on a straight line or in the neighborhood of a straight line, and an accurate normal vector on the model surface might not be acquired; i.e., if the three points are on a straight line, a normal vector cannot be obtained. Moreover, if they are in the neighborhood of a straight line, at the portion where the rate of change of the curvature of an actual model surface is large, the surface obtained is entirely different from an approximate plane of the model surface.

DISCLOSURE OF THE INVENTION

The present invention has been made in view of the aforesaid drawbacks, and an object of the present invention is to provide a noncontact tracing control system whereby points needed for acquiring a normal vector of an accurate model surface can be selected.

To achieve the above object, in accordance with the present invention there is provided a noncontact tracing control system for tracing machining a workpiece through a tracing of the contour of a model without a contact therewith, comprising first and second noncontact distance detectors inclined by a certain angle to a predetermined straight axis, respectively, and attached to a tracer head controlled by the straight axis and a rotation axis rotated around the straight axis, to thereby measure the distance to the model surface without a contact therewith, respectively, a sampling means for sampling measured values of the above respective distance measured by the first and second noncontact distance detectors at predetermined sampling times, a memory means for storing the measured values obtained by the first noncontact distance detector and the second noncontact distance detector and sampled at a plurality of times of sampling, a point selecting means for selecting three points forming a triangle that is closest to an equilateral triangle, from the measured values, a vector calculating means for calculating a normal vector on the model surface based on the measured values of the three points selected by the point selecting means, an angle calculating means for calculating an angle of a projection of the normal vector projected onto a plane at a right angle to the straight axis, and a rotation axis drive means for rotating the rotation axis in the direction of the above angle.

Coordinate values of a plurality of points on the model surface are acquired from the measured values obtained at a plurality of times of sampling, from the two noncontact distance detectors provided at the tracer head, and from these values, the three points forming a triangle closest to an equilateral triangle are selected. A normal vector is acquired using the coordinate values of the vortices of these three points, and the tracer head is rotated in the direction of the projection of this normal vector onto the X-Y plane. Accordingly, as the measuring axes of the noncontact distance detectors are oriented in the direction most nearly perpendicular to the model surface, the distance to the model surface can be measured with a high accuracy.

BEST MODE OF CARRYING OUT THE INVENTION

An embodiment of the present invention will hereinafter be described with reference to the drawings.

Figure 1:
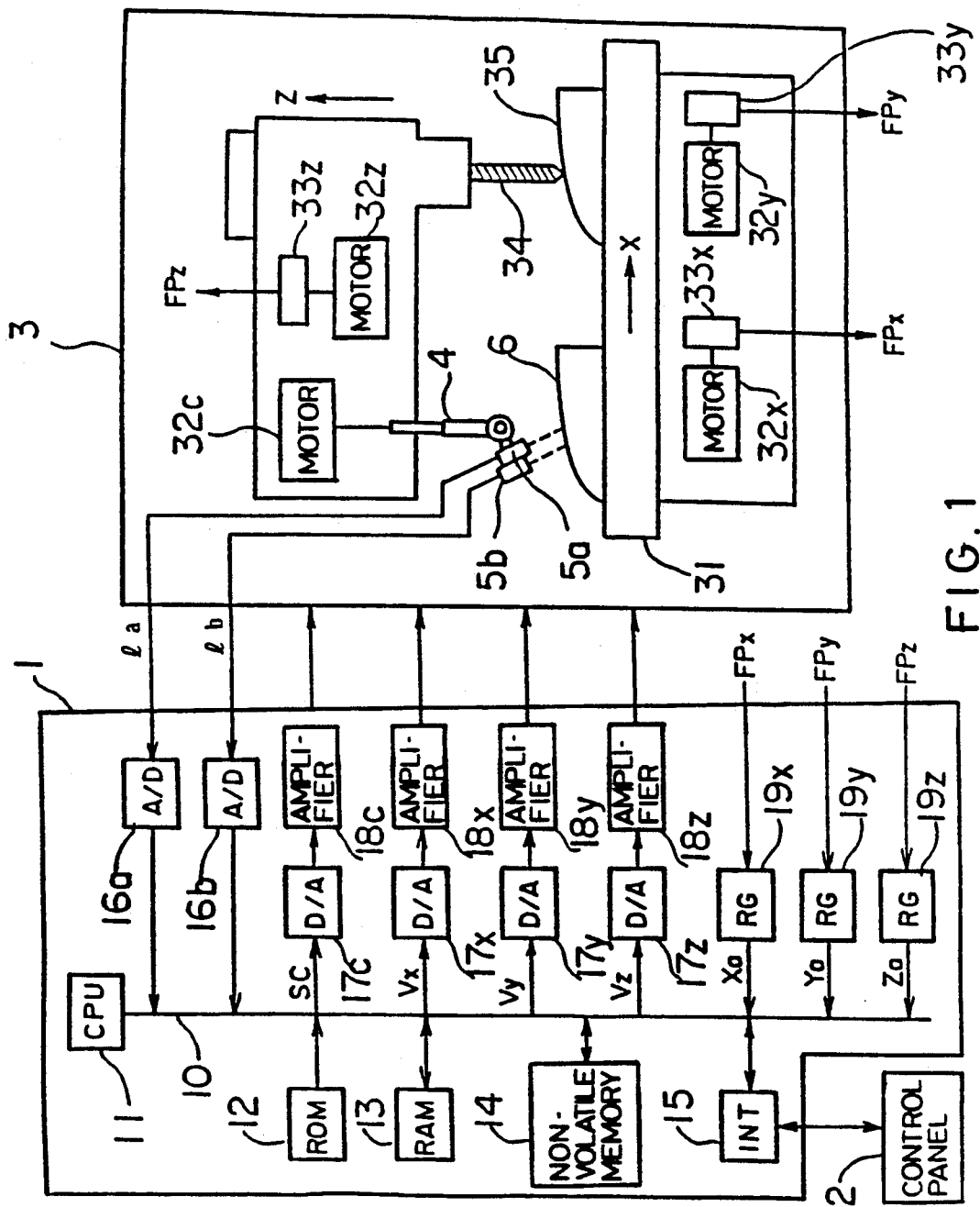
FIG. 1 is a block diagram showing the constitution of a noncontact tracing control system according to an embodiment of the present invention.

FIG. 1 is a block diagram showing a noncontact tracing control system and associated peripheral equipment according to the present invention. In FIG. 1, a processor 11 reads a system program stored in a ROM 12 through a bus 10, and controls the overall operation of a noncontact tracing control system I according to this system program. A RAM 13 temporarily stores data, and stores measured values obtained from distance detectors, described later, and other temporary data. A nonvolatile memory 14 is backed up by a battery, not shown, and stores various parameters such as a tracing direction, tracing speed, etc., input from a control panel 2 through an interface 15.

Distance detectors 5a and 5b are provided at a tracer head 4 of a tracing machine 3. Reflected light amount type distance detectors using a semiconductor laser or a light emitting diode as a light source are utilized for the distance detectors 5a and 5b, which are able to measure the distance to a model 6 without contact therewith. These distances la and lb are converted to digital values by A/D converters 16a and 16b in the noncontact tracing control system 1, and are sequentially read by the processor 11.

The processor 11 calculates the amounts of displacement of each axis, based on the measured values la and lb, and signals from present position registers 19x, 19y, and 19z, described later, and generates speed commands Vx, Vy, and Vz of the respective axes based on these amounts of displacement, the commanded tracing direction, and the tracing speed, according to a known process. These speed commands are converted to digital values by D/A converters 17x, 17y, and 17z and input to servo amplifiers 18x, 18y, and 18z. The servo amplifiers 18x and 18y drive servo motors 32x and 32y of the tracing machine 3, based on these speed commands, to thereby move a table 31 in the X-axis direction and the Y-axis direction at a right angle to the paper surface. Also, the servo amplifier 18z drives a servo motor 32z, to thereby move the tracer head 4 and the toot 34 in the Z-axis direction.

Pulse coders 33x, 33y, and 33z are provided in the servo motors 32x, 32y, and 32z for generating detection Pulses FPx, FPy, and FPz upon a rotation by a predetermined amount of these servo motors. The present position registers 19x, 19y, and 19z in the noncontact tracing control system 1 acquire present position data Xa, Ya, and Za in each axial direction by counting up/down the detection Pulses FPx, FPY, and FPz according to the respective direction of rotation and inputs same to the processor 11.

At the same time, the processor 11 samples the distances la and lb measured by the distance detectors 5a and 5b at predetermined sampling times, simultaneously with the control of the above respective axes, acquires a normal vector on the surface of the model 6 by the method of using this sampling data, described later, and generates a rotation command SC corresponding to the direction of a projection of the normal vector onto the X-Y plane. The rotation command SC is converted to a digital value by the D/A converter 17c and input to the servo amplifier 18c, and based on this command, the servo amplifier 18c drives a servo motor 32c of the C axis.

Accordingly, the tracer head 4 is rotated by the commanded angle and controlled in such a manner that a distance, described later, from the model 6 is kept constant. At the same time, the table 31 is moved in the commanded tracing direction at the commanded tracing speed, and a workpiece 35 is machined to the same shape as that of the model 6 by the toot 34 controlled in the Z-axis direction, as the tracer head 4.

Figure 2:
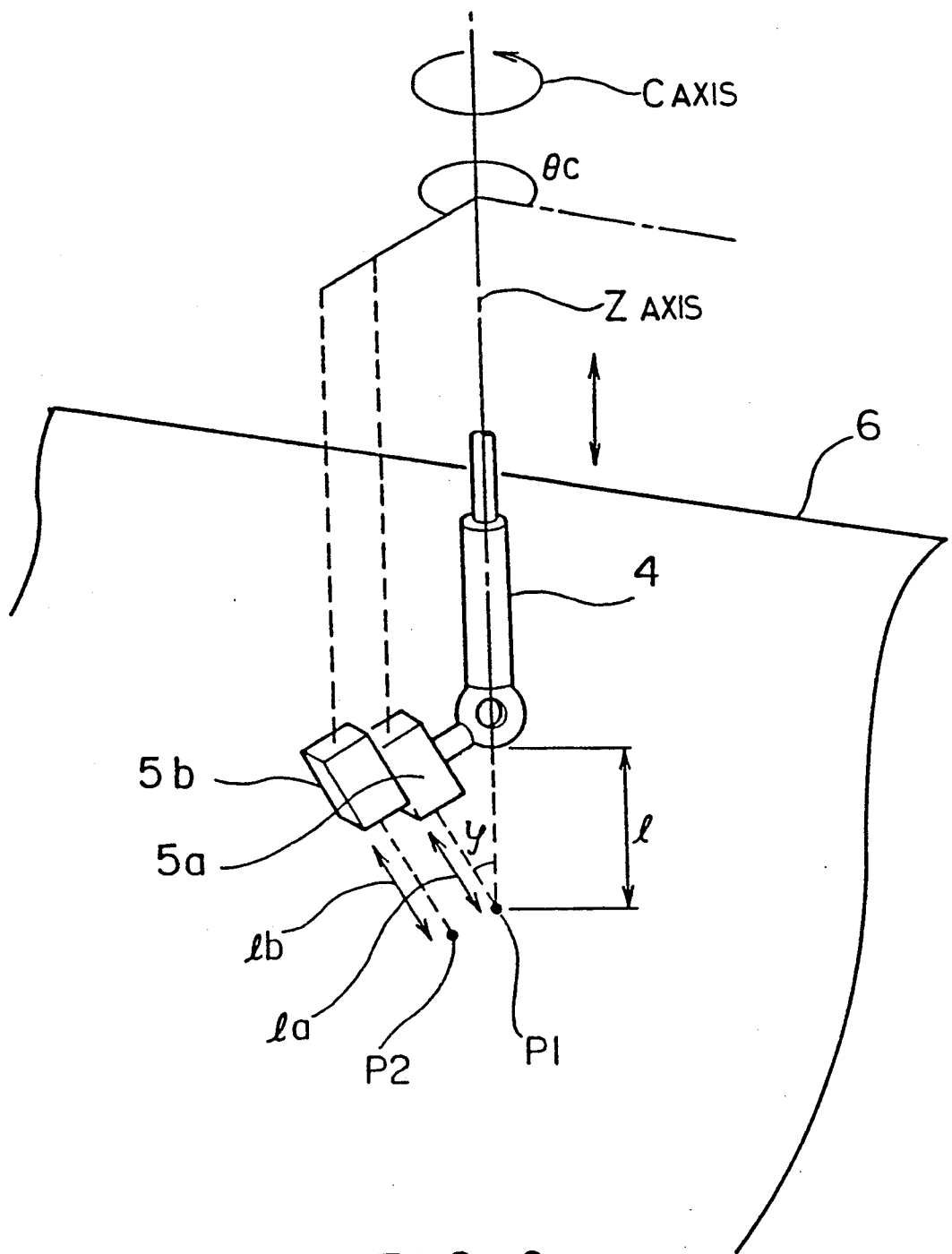
FIG. 2 is a detailed view of a tracer head in a preferred embodiment of the present invention.

FIG. 2 is a detailed view of the tracer head 4. In this Figure, the distance detector 5a is mounted on the tracer head 4 and is inclined by angle $\phi$ to the Z-axis, and rotated by the C-axis along the circumference of a predetermined radius at a commanded angle $\Theta c$ of the rotation command SC. Also, the distance detector 5b is mounted on the outside of the distance detector 5a, and is similarly rotated and controlled at the angle of the commanded angle $\Theta c$.

As mentioned above, by feeding back the measured value obtained by the distance detector 5a to the tracing control system, the distance la from the distance detector 5a to a point of measurement P1 on the model 6 is kept constant. Also, this distance la is set at the distance to the point of an intersection of the measuring axes of the distance detector 5a and the Z-axis, and therefore, even when the tracer head 4 is rotated by the C-axis, the measurement point P1 is not moved, i.e., the distance l from the tracer head 4 to the model 6 is also kept constant.

The distance detector 5b measures the distance lb to a point of measurement P2 on the model 6 and inputs same to the tracing control system.

Figure 3:
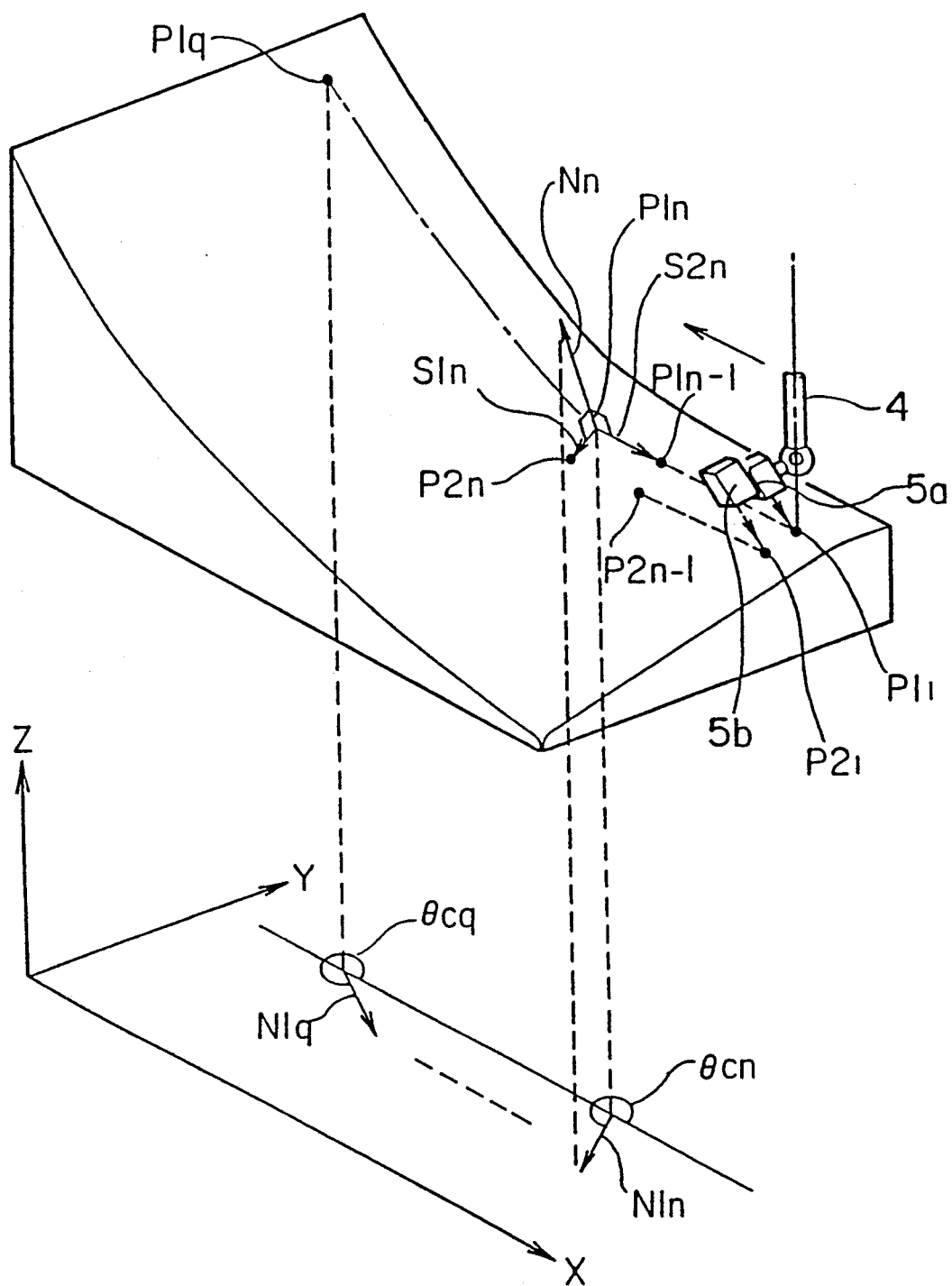
FIG. 3 is an explanatory view of a method of calculating a rotation angle of a tracer head in a preferred embodiment of the present invention.

Next, the method of calculating the rotation angle of the tracer head 4 will be described with reference to FIG. 3. In this Figure, tracing is carried out by moving the tracer head 4 relative to the model 6 in the X-axis direction at a predetermined speed, measured values obtained by the distance detectors 5a and 5b are sampled at predetermined times, and coordinate values of the points $P1_1, \ldots, P1_{n-1}, P1_n$, and $P2_1, \ldots, P2_{n-1}, P2_n$ on the model 6 are acquired based on these measured values and the present position data output from the present position registers.

For example, a surface vector S1n $[X2_n-X1_n, Y2_n-Y1_n, Z2_n-Z1_n]$ is acquired from the coordinate values of the point $P1_n (X1_n, Y1_n, Z1_n)$ and the coordinate values of the point $P2_n (X2_n, Y2_n, Z2_n)$. Also, a surface vector S2n $[X1_{n-1}-X1_n, Y1_{n-1}-Y1_n, Z1_{n-1}-Z1_n]$ is acquired from the coordinate values of the point $P1_n$ $(X1_n, Y1_n/ Z1_n)$ and the coordinate values of the point $P1_{n-1} (X1_{n-1}, Y1_{n-1}, Z1_{n-1})$.

Then, by calculating a vector product of the surface vectors S1n and S2n by the following equation, a normal vector Nn at the point Pn is acquired:

$$Nn = S1n \times S2n$$

(where Nn, S1n and S2n represent vectors)

Further, the angle $\Theta cn$ made by a projection N1n of the normal vector Nn projected onto the X-Y plane and the X-axis is acquired by the following equation, and that angle $\Theta cn$ is out put as a command value of the C axis:

$$\Theta cn = \tan^{-1} (Jn/In)$$

where
  In:X component of the vector Nn
  Jn:Y component of the vector Nn

This angle is changed in accordance with an inclination of the model 6 to, for example, $\Theta cq$ at point $P1q$.

Then, as for the tracer head 4, the measuring axis of the distance detector is oriented in the direction most nearly perpendicular to the surface of the model 6, to thereby obtain a distance measurement with a high accuracy.

Figure 4:
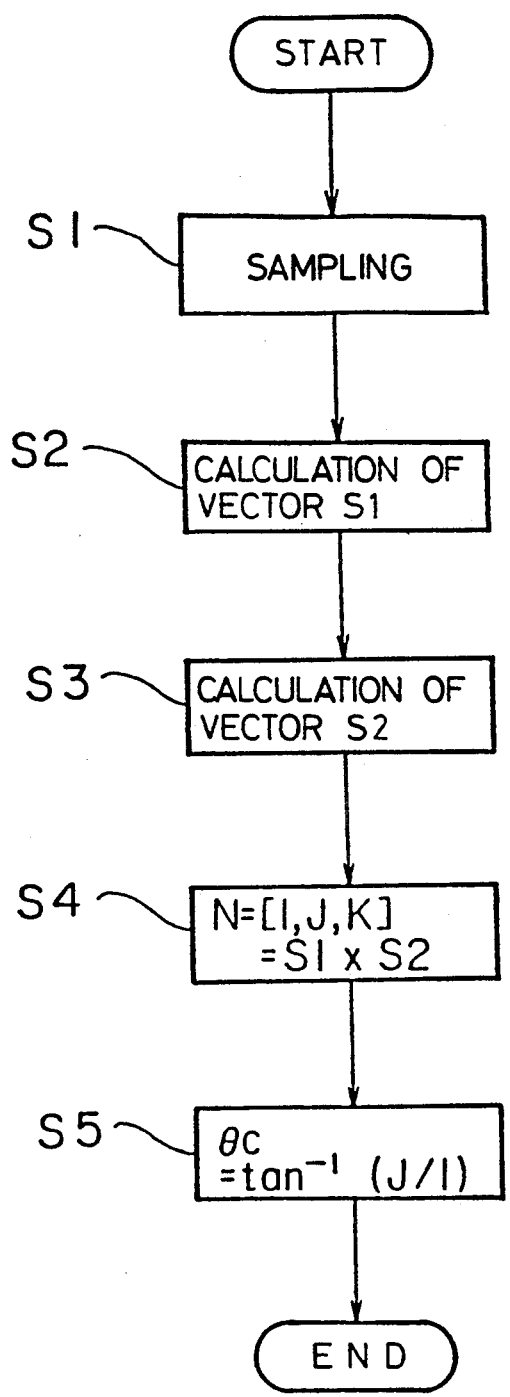
FIG. 4 is a flow chart of a calculation of a rotation angle in a preferred embodiment of the present invention.

Next, the calculation of the above rotation angle will be described. FIG. 4 is a flow chart of the calculation of the rotation angle in a preferred embodiment of the present invention. In this FIG., the numerical values following the letter S represent step numbers.

[S1] The measured values of the distance detectors 5a and 5b are sampled at predetermined times.

[S2] first, two points are selected from the present measurement point and the previous measurement point of the distance detector 5a as described later, and a vector S1 connecting the two points is acquired.

[S3] The remaining point is acquired from the present measurement point, the previous measurement point or the measurement point before last of the distance detector 5b, by a point selecting means described later, and a vector S2 is acquired by connecting the previous measurement point obtained by the distance detector 5a and the selected point.

[S4] A normal vector N is acquired by calculating a vector product of the vector S1 and the vector S2.

[S5] The angle $\Theta c$ formed by a projection of the normal vector N onto the X-Y plane and the X-axis is calculated.

Figure 5:
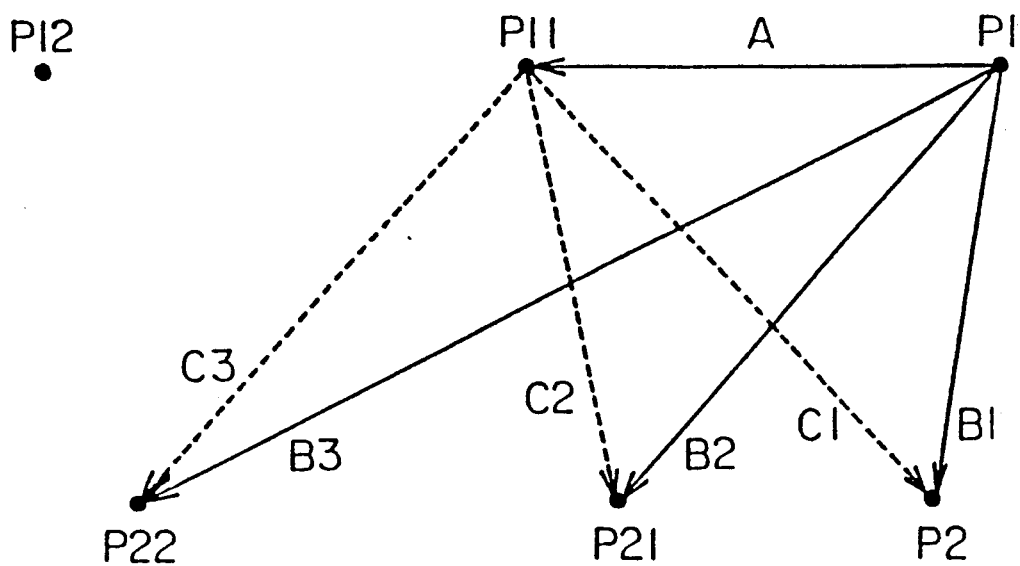
FIG. 5 is an explanatory view of a point selecting means for selecting three points forming a triangle closest to an equilateral triangle.

The procedure for selecting three points forming a triangle closest to an equilateral triangle, to thereby acquire an accurate normal vector Nn, will be now described. FIG. 5 is an explanatory view of the point selecting means for selecting the three points forming a triangle closest to an equilateral triangle. The present measurement point obtained by the distance detector 5a is made P1, the previous measurement point made P11, and the measurement point before last made P12, respectively. These points correspond to the points $P1_n$, $P1_{n-1}$, ... in FIG. 3. Also, the present measurement point obtained by the distance detector 5b is made P2, the previous measurement point made P21, and the measurement point before last made P22, respectively. These points correspond to the points $P2_n$, $P2_{n-1}$, ... in FIG. 3.

First, the measurement points P1 and P11 of the distance detector 5a are selected as two points, and then the point forming a triangle closest to an equilateral triangle is selected from among the points P2, P21, and P22.

Here, three triangles, i.e., the triangle formed by P1, P11 and P2, the triangle formed by P1, P11 and P21, and the triangle formed by P1, P11 and P22, are considered.

The distance between the point P1 and the point P11 is made A, the distances between the point P1 and the point P2, the point P21 and the point P22 are made B1, B2, and B3, respectively, and the distances between the point P11 and the point P2, the point P21, and the point P22 are made C1, C2, and C3, respectively.

Here, for example, it is assumed that the following inequalities are established:

$$C1 > A > B1$$
$$B2 > A > C2$$
$$B3 > C3 > A$$

Accordingly, the ratio of the minimum length to the maximum length of each triangle is as follows:

$$R1 = B1/C1$$
$$R2 = C2/B2$$
$$R3 = A/B3$$

Here, if $R2 > R1 > R3$ is established, this means that the triangle formed by P1, P11 and P21 is the closest to an equilateral triangle, and thus the point P21 can be selected as the third point. Namely, the three points of point P1, point P11, and point P21 may be selected.

Although, in the above explanation, the first two points are the present measurement point and the previous measurement point of the distance detector 5a, the measurement is not limited to those points as the present measurement points of the distance detectors 5a and 5b also may be used.

Therefore, by acquiring a normal vector through a selection of three points, to thereby control the rotation angle of the tracer head by this normal vector, a tracing control with higher accuracy can be performed.

Also, although the above explanation has been made with regard to a tracing control, it can be also applied to a digitizing control.

Also, an optical trigonometrical type, an eddy current type or an ultrasonic type distance detector also can be used for the distance detector.

With the present invention, as described above, as three points forming a triangle closest to an equilateral triangle are selected from among a plurality of measurement points obtained from two noncontact distance detectors provided at the tracer head, a normal vector of the model surface is acquired based on the measured values, and the tracer head is rotated and controlled in the direction of a projection of this normal vector onto a predetermined plane, the measuring axis of the noncontact distance detector is oriented in the direction most nearly perpendicular to the model surface at all times, and accordingly, a distance measurement with a high accuracy is obtained, and thus the tracing accuracy is improved.

Also, a digitizing operation with a high accuracy can be obtained.

We claim:

1. A non-contact tracing control system for machining a workpiece through a tracing of contours of a model without contact therewith, comprising:
   a tracer head, first and second noncontact distance detectors attached to said tracer head, said tracer head mounted for movement along a straight axis, said detectors being inclined by a certain angle to said straight axis, said detectors also mounted to rotate about said straight axis to thereby measure the distance to the model surface without contact therewith, respectively;
   sampling means for sampling measured values of the respective distances of said first and second non-contact distance detectors at predetermined sampling times;
   memory means for storing measured values obtained from said first non-contact distance detector and said second non-contact distance detector sampled at a plurality of times of sampling;
   point selecting means for selecting three points forming a triangle closest to an equilateral triangle, from among the measured values;
   vector calculating means for calculating a normal vector on the model surface based on measured values of the three points selected by said point selecting means;
   angle calculating means for calculating an angle of a projection of the normal vector projected onto a plane at a right angle to the straight axis; and
   rotation drive means for rotating the detectors about said straight axis in the direction of said angle.

2. A noncontact tracing control system according to claim 1, wherein said vector calculating means acquires coordinate values of different three points on said model surface based on said three measured values, acquires first and second vectors leading to the other two points from one of the coordinate values of said three points, and calculates said normal vector by calculating a vector product of said first and second vectors.

3. A noncontact tracing control system according to claim 1, wherein said point selecting means selects two points and selects the point, from among the remaining plurality of points, at which a ratio of a minimum value to a maximum value (minimum value/maximum value) of each side constituting a triangle becomes largest.

4. A noncontact tracing control system according to claim 3, wherein said two points comprise a present measurement point and a previous measurement point of one of said first and second noncontact distance detectors.

5. A noncontact tracing control system according to claim 3, wherein said two points are present measurement points of said first and second noncontact distance detectors.

* * * * *